(12) United States Patent
Yamada et al.

(10) Patent No.: US 7,751,968 B2
(45) Date of Patent: Jul. 6, 2010

(54) METHOD AND SYSTEM FOR GENERATING MAP DATA AND INFORMATION DELIVERY APPARATUS

(75) Inventors: Wako Yamada, Okazaki (JP); Akihiro Ogasawara, Toyokawa (JP)

(73) Assignee: DENSO CORPORATION, Kariya (JP)

( * ) Notice: Subject to any disclaimer, the term of this patent is extended or adjusted under 35 U.S.C. 154(b) by 948 days.

(21) Appl. No.: 11/498,234

(22) Filed: Aug. 3, 2006

(65) Prior Publication Data
US 2007/0032947 A1 Feb. 8, 2007

(30) Foreign Application Priority Data
Aug. 3, 2005 (JP) .............................. 2005-225528
Apr. 27, 2006 (JP) .............................. 2006-123713

(51) Int. Cl.
*G06F 17/30* (2006.01)
*G06Q 50/00* (2006.01)

(52) U.S. Cl. .............................. 701/200; 707/102; 705/1

(58) Field of Classification Search ........................ None
See application file for complete search history.

(56) References Cited

U.S. PATENT DOCUMENTS

| | | | | |
|---|---|---|---|---|
| 5,802,492 | A | * | 9/1998 | DeLorme et al. ............ 455/456.5 |
| 6,532,417 | B2 | * | 3/2003 | Hatano ....................... 701/207 |
| 6,542,812 | B1 | * | 4/2003 | Obradovich et al. ......... 701/207 |
| 6,725,155 | B1 | * | 4/2004 | Takahashi et al. ........... 701/209 |
| 6,937,936 | B2 | * | 8/2005 | Nimura ...................... 701/208 |
| 7,274,378 | B2 | * | 9/2007 | McAvoy et al. ............. 345/629 |
| 2001/0037305 | A1 | * | 11/2001 | Mochizuki .................. 705/52 |
| 2002/0156739 | A1 | * | 10/2002 | Hirai et al. .................. 705/52 |

FOREIGN PATENT DOCUMENTS

| | | |
|---|---|---|
| JP | A-2000-357191 | 12/2000 |
| JP | A-2002-296050 | 10/2002 |
| JP | A-2004-355075 | 12/2004 |
| JP | A-2005-030980 | 2/2005 |

* cited by examiner

*Primary Examiner*—Michael J. Zanelli
(74) *Attorney, Agent, or Firm*—Posz Law Group, PLC

(57) ABSTRACT

A system for generating map data acquires, from a map database, map data to include a route from a departure place to a destination specified by a user. The system acquires, from a POI database, information to suit a purpose or taste of the user. The system generates specified map data, in which the information to suit the purpose or taste of the user is added over a map including the route specified by the user.

20 Claims, 9 Drawing Sheets

○ CUSTOMER'S TASTE
△ FELLOW PASSENGER'S TASTE

US 7,751,968 B2

METHOD AND SYSTEM FOR GENERATING MAP DATA AND INFORMATION DELIVERY APPARATUS

CROSS REFERENCE TO RELATED APPLICATIONS

This application is based on and incorporates herein by reference Japanese Patent Applications No. 2005-225528 filed on Aug. 3, 2005 and No. 2006-123713 filed on Apr. 27, 2006.

FIELD OF THE INVENTION

The present invention relates to a method and system for generating map data and an information delivery apparatus that uses the generated map data.

BACKGROUND OF THE INVENTION

An apparatus with a display function such as a car navigation apparatus uses a map covering some or entire areas of a country. For instance, the map is provided by a car navigation apparatus manufacturer.

As a method for providing map data from a service provider's computer to a user' computer through a network, the following method has been proposed: it is made possible for a user's computer to utilize map data from a service provider's computer, using license data distributed by the service provider; further, a usage fee is charged according to the history of usage with respect to map data used by the user's computer. (Refer to Patent Document 1, for example.)

Patent Document 1: JP-2000-357191 A

However, the above method involves a problem. Map data is provided by navigation apparatus manufacturers, service providers, or the like, as mentioned above. The map data contains such information as POI (Point of Interest) information (or facility information) and guidance information so as to satisfy a large number of users. Therefore, such map data might contain information unnecessary for a user or contain no information necessary for a user.

SUMMARY OF THE INVENTION

The invention has been made with the above problem taken into account. It is an object of the invention to provide map data to suit a user's intention such as a user's purpose of use of the map data or a user's taste.

As an aspect of the present invention, map data is generated as follows. Certain map data, which is relating to a specified area, is acquired from a map database; certain information, which suits a user's intention relating to generating map data, is acquired from an additional information database; and specified map data is generated by adding information, which is included in the certain information and related to the certain map data, to the certain map data.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

First Embodiment

Figure 1:
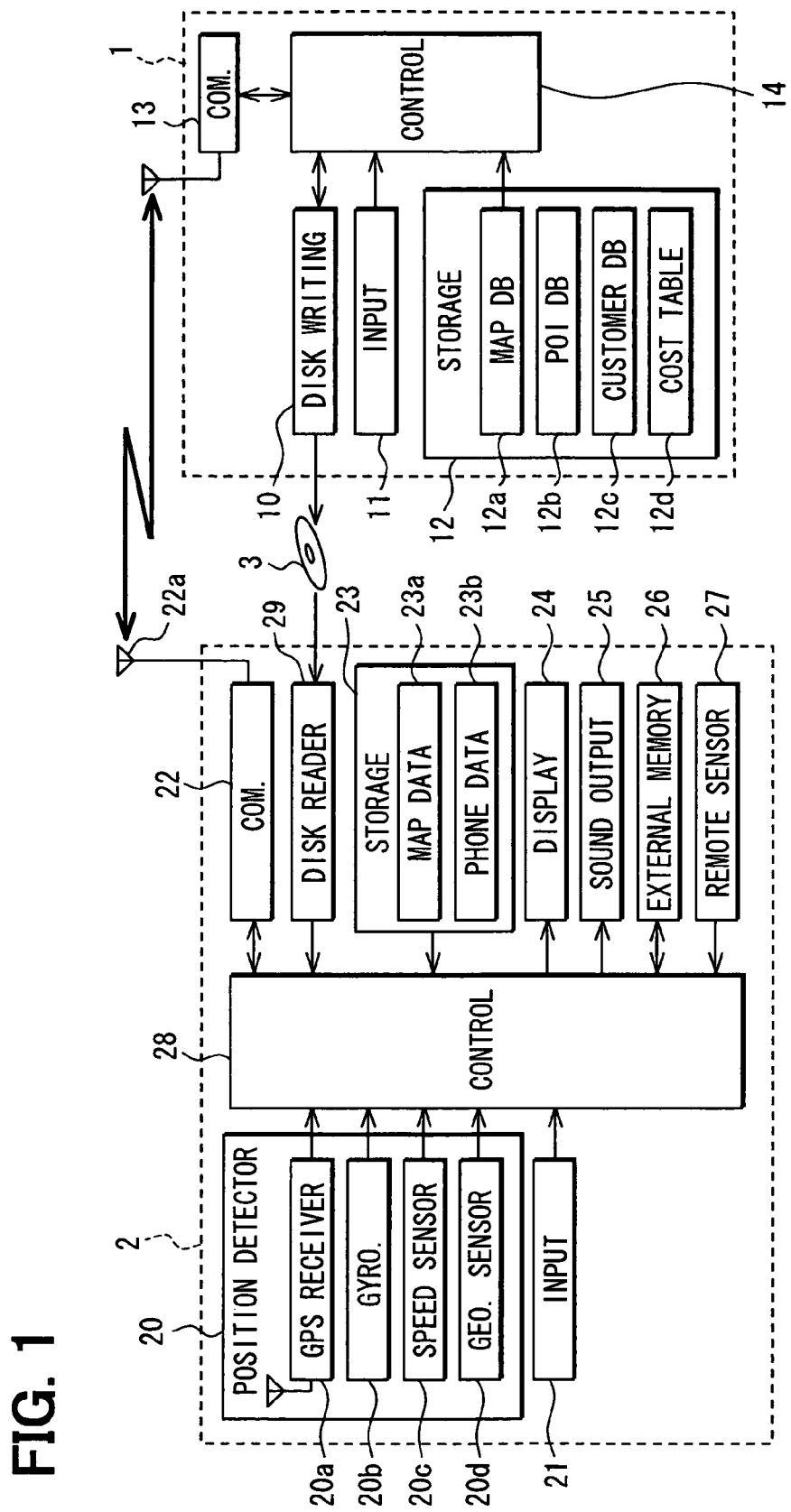
FIG. 1 is a diagram illustrating a configuration of a system in a specified map supply center and a navigation apparatus according to a first embodiment of the present invention.

FIG. 1 illustrates a configuration of a system 1 for generating map data in a specified map supply center and a navigation apparatus 2 according to a first embodiment of the invention. A system 1 in a specified map supply center (or a specified map supply center system 1) includes a disk writing device 10, an input operation unit 11, a storage device 12, a communication device 13, and a control device 14.

The disk writing device 10 writes data to such disk media 3 as CD or DVD or reads data from disk media 3 according to a signal inputted from the control device 14.

The input operation unit 11 is constructed of a keyboard, a mouse, and the like, and outputs a signal corresponding to the operation by a customer to the control device 14. (Hereinafter, user will be referred to as customer.)

Provided with such storage media as hard disk, the storage device 12 stores data on the storage media according to a signal inputted from the control device 14, and further reads data from storage media according to a signal inputted from the control device 14. On the storage media of the storage device 12, there are stored a map database 12a, a POI database (additional information database) 12b, a customer database 12c, a cost table 12d, various programs, and the like.

The map database 12a is what is obtained by compiling, as a database, map data that represents the maps of all parts of the country based on latitude and longitude coordinates. The map data includes road information, information indicating topography, and the like.

The POI database 12b is what is obtained by compiling, as a database, additional information, such as POI information (symbolized information), for displaying various facilities, including lodging hotels, restaurants, and shopping centers, over a map. As POI information, for example, symbols indicating hotels, symbols indicating restaurants, symbols indicating shopping centers, and the like are stored together with position information indicating positions on maps.

The customer database 12c is what is obtained by compiling, as a database, customer information, travel information, and information on customer's taste with respect to each customer. The customer information includes such information as each customer's personal information, membership information, vehicle ID, information on the model of a navigation apparatus used, and authentication information. The travel information includes information (departure place, destination, transit place, circular drive route, travel schedule) on the travels in the past of each customer. The information on customer's taste includes each customer's favorite facilities (for example, lodging hotels used by the customer in the past, favorite restaurants, favorite shopping centers).

Figure 2:
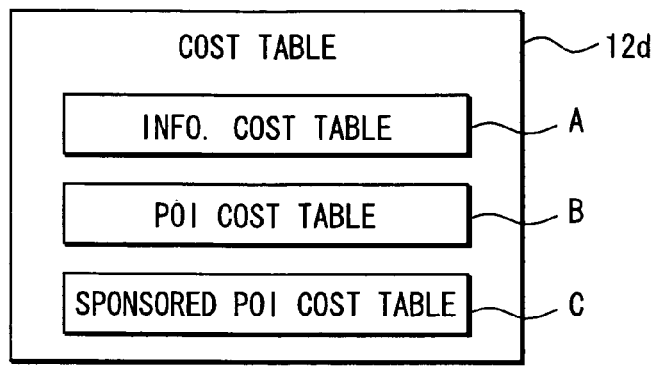
FIG. 2 is a diagram illustrating a composition of a cost table.

The cost table 12d is a table in which costs for computing the prices of specified map data are defined. As illustrated in FIG. 2, it is divided into information cost table A, POI cost table B, and sponsored POI cost table C.

The information cost table A is a table in which costs of the varied information stored in the map database 12a are defined. For example, costs of map data per unit area, costs of regulation information, such as speed limit information, and the like are defined in the table.

The POI cost table B is a table in which the costs of POI (symbolized) information related to notable sites, hotels, restaurants, and the like are defined.

The sponsored POI cost table C is a table in which discounting advertisement costs are defined. The discounting advertisement cost is for computing a price reduction by which the price of specified map data is discounted when sponsored symbolized information, described later, is added to the specified map data.

The costs defined in the information cost table A, POI cost table B, and sponsored POI cost table C are defined with respect to each minimum unit of information or with respect to each group of grouped pieces of information.

The communication device 13 is a device for communicating with external communication equipment by connecting to a public line or connecting to the Internet through a network.

The control device 14 is constructed of a computer including CPU, memory, and the like. It communicates varied data between it and the disk writing device 10, input operation unit 11, storage device 12, and communication device 13 according to programs stored in the storage device 12.

With the above-mentioned configuration, the system 1 in the specified map supply center performs the following operation in response to a request to generate a specified map from the customer at a navigation apparatus 2: it generates specified map data obtained by adding information to suit the customer's purpose or taste to a map including routes from a departure place to a destination specified by the customer.

When a customer requests specified map data, he/she specifies a method for providing the specified map data. The customer can acquire the specified map data by either of the following methods: downloading from a specific website; and mailing of disk media 3, such as CD or DVD.

The navigation apparatus 2 is mounted in a vehicle and includes: a position detector 20 that detects a position of the vehicle (or a position of the navigation apparatus 2 itself) based on various signals outputted from a GPS receiver 20a; a gyroscope 20b, a vehicle speed sensor 20c, and a geomagnetic sensor 20d; an input operation unit 21 constructed of a touch panel, push-button switches, and the like; a communication device 22 for communication with the outside; a storage device 23 in which map data 23a and telephone directory data 23b are stored; and a control circuit 28. Further, the navigation apparatus 2 includes: a display unit 24 that displays an image corresponding to an image signal inputted from the control circuit 28; a sound output unit 25 that outputs sound corresponding to a sound signal inputted from the control circuit 28; an external memory 26 for storing varied data according to a signal inputted from the control circuit 28; and a remote sensor 27 that receives a radio signal transmitted from a remote and transmits it to the control circuit 28.

The communication device 22 has an external antenna 22a for wireless communication, and communicates with the system 1 in the specified map supply center by connecting to a public line or connecting the Internet via a communication network through this external antenna 22a.

The navigation apparatus 2 has a disk reader 29 that reads data, written on such a media disk as CD or DVD, according to a signal inputted from the control circuit 28.

The control circuit 28 is constructed of a computer and communicates varied data with the position detector 20, operation unit 21, communication device 22, storage device 23, display unit 24, sound output unit 25, external memory 26, remote sensor 27, and disk reader 29 according to programs stored in the storage device 23.

The control circuit 28 of the navigation apparatus 2 carries out a map display function and a routing assistance function according to the customer's operation of the input operation unit 21. The map display function is for displaying the relevant vehicle position mark over a map on the display unit 24 based on the relevant vehicle position detected by the position detector 20 and map data 23a in the storage device 23. The routing assistance function is for searching for guided routes from a departure place to a destination and providing routing assistance based on the guided routes.

The control circuit 28 performs the following operation according to the customer's operation of the input operation unit 21: it downloads specified map data, supplied from the system 1 in the specified map supply center through the Internet, to the storage device 23, and displays a map or provides routing assistance using this specified map data. When a piece of disk media with specified map data written on it is loaded into the disk reader 29, the control circuit 28 displays a map or provides routing assistance using the specified map data written on the disk media.

Description will be given to the operation of the system 1 in the specified map supply center. On receipt of a request to generate map data from the customer at the navigation apparatus 2, the system 1 in the specified map supply center performs the following operation: it compiles specified map data to which information to suit the customer's purpose or taste is added and provides the data to the customer. In this embodiment, a request to generate specified map data from the customer at the navigation apparatus 2 is accepted on a website on the Internet. Specifically, the customer operates the navigation apparatus 2 to connect to the Internet and makes a request to generate specified map data by inputting customer information, travel information, and information on customer's taste following instructions on the generation request screen for specified map data on the specific website on the Internet. Each piece of information inputted following instructions on the generation request screen for specified map data is transmitted to the system 1 in the specified map supply center. As explained above, the inputted customer information, travel information, and information on customer's taste are stored in the customer database 12c. In other words, the customer database 12c includes information used to indicate customer's intentions (or requests) for generating specified map data. The intentions are explicitly or implicitly expressed as a purpose or taste in the customer information, travel information, or information on customer's taste with respect to each customer.

Figure 3A:
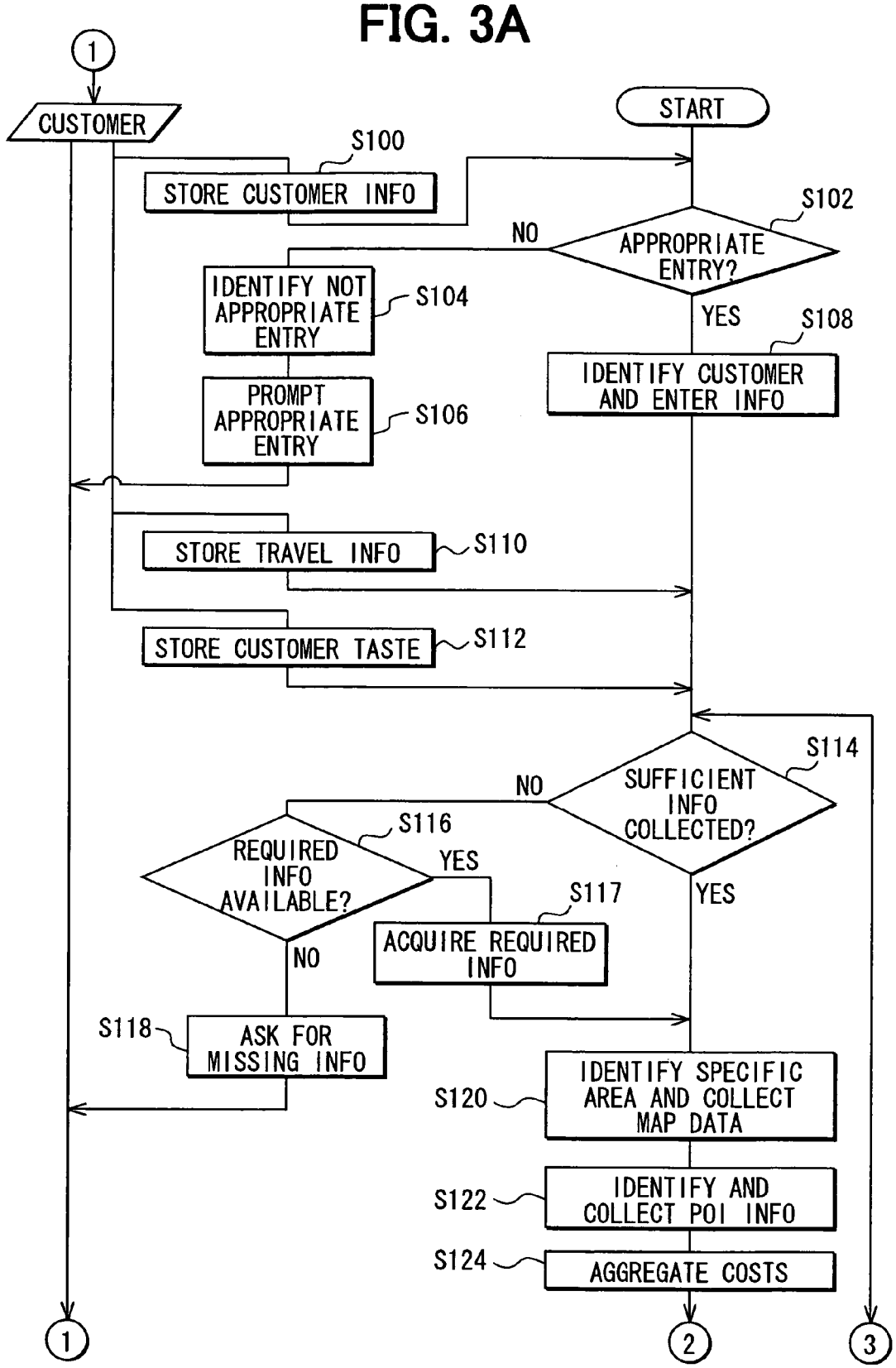
FIG. 3A is a diagram illustrating a process in which map data is generated by a control device of the system according to the first embodiment.
Figure 3B:
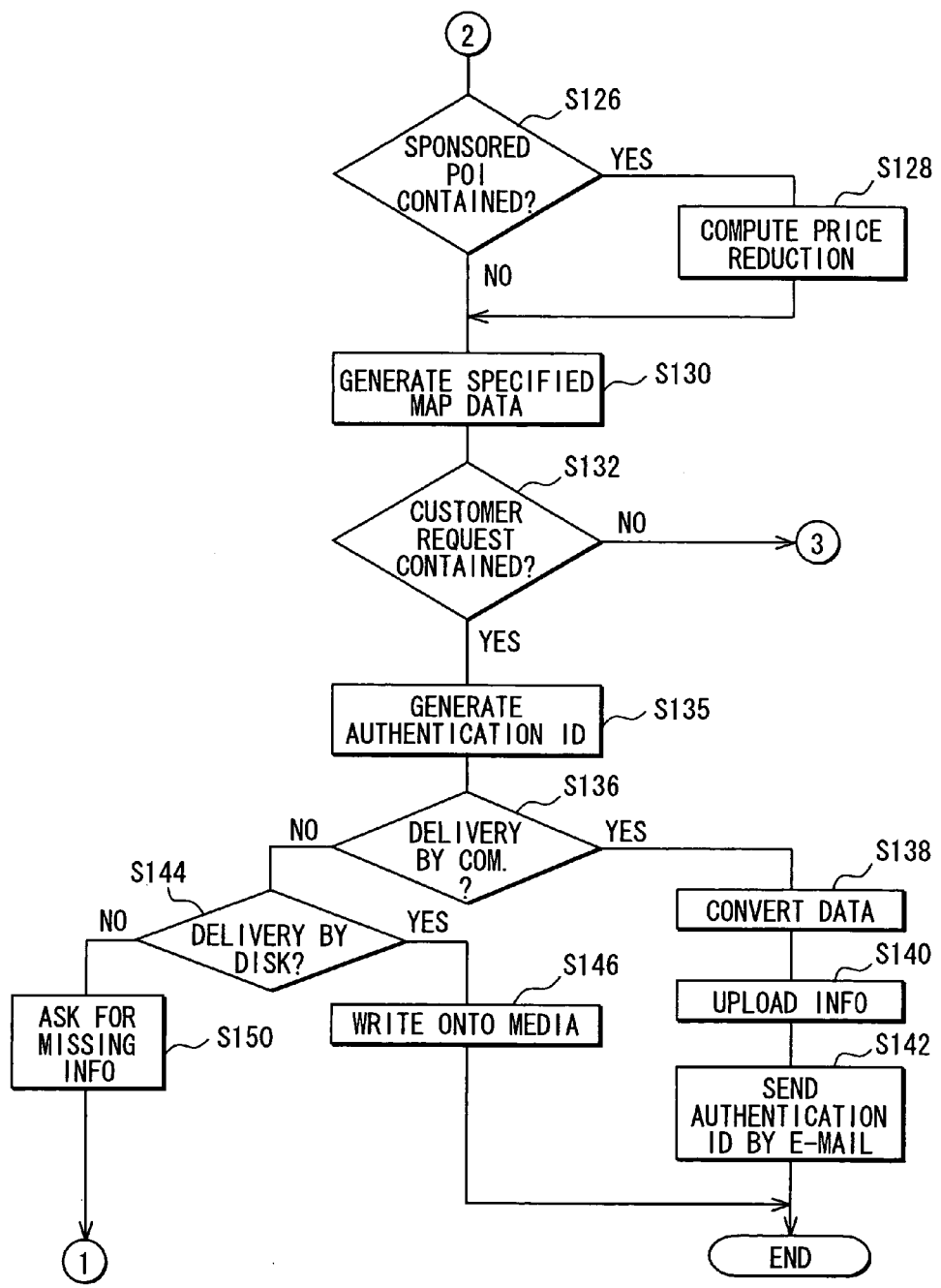
FIG. 3B is a diagram illustrating a process in which map data is generated by the control device of the system according to the first embodiment.

Description will be given to the process to generate specified map data performed by the control device 14 with reference to FIGS. 3A and 3B. When information inputted following instructions on the generation request screen for specified map data is transmitted to the system 1 in the specified map supply center, the control device 14 performs the process illustrated in FIGS. 3A and 3B.

First, the control device stores the customer's customer information in the customer database 12c (S100). The customer information includes each customer's personal information, membership information, vehicle ID, information on the model of a navigation apparatus used, authentication information, and supply method for specified map data.

It is determined whether or not the conditions for generating a specified map are satisfied based on whether or not appropriate entry has been made with respect to all the predetermined prerequisite items of customer information (S102).

In cases where entry has not been made with respect to all the prerequisite items of customer information, negative determination is made at S102. Any item for which appropriate entry has not been made is identified (S104), and the identified item is reported to the customer. Specifically, a prompt to make appropriate entry with respect to the prerequisite item is displayed on the screen on the website (S106).

In cases where appropriate entry has been completed with respect to all the prerequisite items of customer information, affirmative determination is made at S102. Then, a map compilation format is identified based on the information on the model of a navigation apparatus used contained in the customer information, and, at the same time, a target customer is identified based on each customer's personal information contained in the customer information. The pertinent vehicle ID is entered into the storage device 12 together with the identified map compilation format and target customer (S108).

The control device stores the customer's travel information in the customer database 12c (S110). The travel information includes information on departure place, destination, transit place, circular drive route, and travel schedule.

The control device stores information on customer's taste in the customer database (S112). The information on customer's taste includes information on such facilities as lodging hotels, restaurants, and shopping centers. The information on customer's taste may be specified as affiliated facilities, for example, as affiliated lodging hotels, a restaurant chain, or affiliated shopping centers. Or, it may be specified as a specific facility, for example, as a specific lodging hotel, a specific restaurant, or a specific shopping center. In case of restaurants, information about whether all the seats are no-smoking seats or whether smoking is permitted may be specified.

It is determined whether or not sufficient information to generate specified map data has been collected. Information required for the generation of specified map data is predetermined. It is determined from the acquired travel information and information on customer's taste whether or not sufficient information to generate specified map data has been collected or not (S114).

In cases where sufficient information to generate specified map data has not been collected, negative determination is made at S114. Then, the customer database 12c is searched for missing information, and it is determined whether or not the required information is available from the customer database (S116).

In cases where the missing information is not retrieved from the customer database 12c, negative determination is made at S116, and the customer is asked for the missing information. Specifically, a prompt to input the missing information is displayed on the input screen on the website (S118).

In cases where the missing information is retrieved from the customer database 12c, affirmative determination is made at S116, and travel information and information on customer's taste are acquired from the customer database 12c. As an example, it will be assumed that, though intent to stay overnight is perceived from travel schedule, information about lodging hotels has not been inputted as information on customer's taste. In this case, the customer database 12c is searched for lodging hotels used by the customer in the past (S117).

An area about which specified map data should be generated is identified from travel information, and map data on the identified area is acquired from the map database 12a. Specifically, a specific area including routes from a departure place to a destination is identified as an area about which specified map data should be generated, and map data on the identified area is acquired from the map database 12a. This map data includes road information, information indicating topography, and the like related to the identified area (S120).

POI information to be added to specified map data is identified from the information on customer's taste, and the identified POI information is acquired from the POI database 12b (S122). For example, POI information to be added to specified map data is identified from the information on customer's taste inputted by the customer. The information on customer's taste includes information about affiliated facilities, such as affiliated lodging hotels, a restaurant chain, and affiliated shopping centers and information about a specific facility, such as a specific lodging hotel, a specific restaurant, and a specific shopping center. The identified POI information is acquired from the POI database 12b. In cases where a lodging hotel used in the past was retrieved from the customer database 12c at S117, POI information on the retrieved lodging hotel is acquired from the POI database 12b.

The cost table for computing the price of the specified map data is referenced to compute the price of the specified map data. Specifically, the following operation is performed: all the pieces of information used to generate the specified map data are extracted, and the information cost table and the POI cost table are referenced to aggregate costs required for all the pieces of information used for the generation of the specified map data; and thus the price of the specified map data is computed (S124).

It is determined whether or not the specified map data contains sponsored POI information (S126). In cases where sponsored POI information is added to specified map data, discounting redeemable through the corresponding sponsor is applied.

In cases where the specified map data contains sponsored POI information, affirmative determination is made at S126. Then, a price reduction corresponding to the sponsored POI information added to the specified map data is computed based on discounting advertisement cost defined in the sponsored POI cost table. The computed price reduction is subtracted from the price of the specified map data during price computation. That is, a price reduction corresponding to sponsored POI information added to specified map data is computed, and the computed price reduction is discounted from the price of the specified map data (S128).

The POI information acquired at S122 is added to the map containing routes from the departure place to the destination, acquired at S120, to generate specified map data (S130).

It is determined whether or not the items requested by the customer are all covered by the generated specified map data. Specifically, it is determined whether or not the generated specified map data contains each item of requests (or intentions) indicated as the customer information acquired at S100, the travel information acquired at S110, and the information on customer's taste acquired at S112 (S132).

In cases where there is a missing item, the process returns to S114. In cases where there is not a missing item, affirmative determination is made at S132, and then authentication information for authenticating the customer is generated from the customer's membership information, vehicle ID, and information on the model of a navigation apparatus used. Specifically, the following operation is performed: an authentication ID is generated in accordance with a predetermined rule using the customer's membership information, vehicle ID, and information on the model of a navigation apparatus used; further, computation is carried out according to a predetermined algorithm using this authentication ID, and the result of authentication computation is thereby generated. Thus, the authentication ID and the result of authentication computation are generated as authentication information for authenticating the customer (S135).

It is determined based on the customer information stored in the storage device 12 whether or not the supply method for the specified map data is delivery by communication (S136).

In cases where the supply method for the specified map data is delivery by communication, affirmative determination is made at S136. Then, data with the result of authentication computation added to it is added to the generated specified map data, the data format of which is in turn converted into such a format that the data can be downloaded from the website (S138).

The information subjected to data conversion at S138 is transmitted by a communication medium specified by the customer. Specifically, the information subjected to data conversion is uploaded to the website (S140).

The authentication ID is transmitted by a communication medium different from the communication medium by which the specified map data with the result of authentication computation added to it was transmitted. Specifically, the authentication ID is transmitted to the customer by e-mail (S142), and this process is terminated.

In cases where the supply method for the specified map data is not delivery by communication, negative determination is made at S136, and it is determined whether or not the supply method for the specified map data is delivery by disk (S144).

In cases where the supply method for the specified map data is delivery by disk, affirmative determination is made at S144. Then, the result of authentication computation is added to the specified map data, which is in turn written onto such disk media as CD or DVD by the disk writing device 10 (S146), and this process is terminated.

When it is determined at S144 that the supply method for the specified map data is not delivery by disk, the customer is asked for the missing information again. Specifically, a prompt to input the missing information is displayed on the input screen on the website (S150).

The disk medium with the specified map data written on it is so prepared that the customer can recognize the authentication ID and is delivered to the customer by mail.

When a request to generate specified map data comes from the customer of the navigation apparatus 2, the control device 14 performs the following operation, as mentioned above: it acquires map data containing routes from a departure place to a destination specified by this customer from the map database; it acquires information to suit the customer's purpose or taste from the POI database; and it adds the information to suit the customer's purpose or taste to a map containing routes from a departure place to a destination specified by the customer to generate specified map data.

The control circuit 28 of the navigation apparatus 2 is so constructed that it can perform the following operation: when a disk medium with specified map data written on it is inserted into the disk reader 29, the control circuit 28 performs predetermined authentication process; when the authentication process is completed, it displays a map or provides routing assistance using the specified map data written on this disk medium.

Description will be given to the authentication process performed by the control circuit 28 with reference to FIG. 4. When a disk medium with specified map data written on it is inserted into the disk reader 29, a screen image that prompts the customer to input an authentication ID is displayed on the display unit 24. When the authentication ID is inputted from the input operation unit 21 according to the customer's operation, this authentication ID is stored in the external memory 26 (S200).

Then, the control circuit 28 carries out computation according to a predetermined algorithm using the authentication ID stored in the external memory 26, and it thereby generates the result of authentication computation. It carries out authentication by checking this result of authentication computation against the result of authentication computation contained in the disk medium. The algorithm used here is the same as that used in the process of S135. Specifically, the following is operation is performed: when the results of authentication computation agree with each other, it is determined that authentication has been completed and this authentication computation is terminated; when the results of authentication process do not agree with each other, it is determined that authentication has not been completed and this authentication process is terminated (S202).

When authentication is completed in the above-mentioned authentication process, the control circuit 28 of the navigation apparatus 2 displays a map or provides routing assistance using the specified map data written on the disk medium. When authentication is not completed, it does not display a map or provide routing assistance using the specified map data written on the disk medium.

As mentioned above, the system 1 in the specified map supply center performs the following operation: it acquires map data containing routes from a departure place to a destination specified by a customer from the map database 12a (S120); it acquires information to suit the customer's purpose or taste from the POI database 12b (S122); and it adds the information to suit the customer's purpose or taste to the map containing the routes from the departure place to the destination specified by the customer to generate specified map data (S130). Therefore, it is possible to generate specified map data in which information to suit customer's purpose or taste is added to a map containing routes from a departure place to a destination specified by the customer, and to provide map data to suit the customer's purpose of use of map data or the customer's taste.

The information to suit a customer's purpose of use of map data is information to suit the customer's purpose, for example, sightseeing or business. The information to suit a customer's taste is symbolized information on a facility that meets conditions specified by the customer and symbolized information on a specific facility used by the customer in the past or symbolized information on a facility belonging to the same business affiliation as that of a facility used by the customer in the past.

Since authentication information for authenticating a customer is added to specified map data, the vehicle or customer that may use the specified map data can be limited.

As mentioned above, the price of specified map data is computed using the cost table for computing the price of the specified map data, and the computed price is included in the specified map data. Therefore, it is possible to set prices based on information used in specified map data.

As mentioned above, a price reduction corresponding to sponsored symbolized information added to specified map data is computed based on discounting advertisement costs defined in the cost table, and the computed price reduction is discounted from the price of specified map data. Therefore, sponsors can conduct advertising through display of sponsored symbolized information, and customers can enjoy the application of discount prices to specified map data.

Second Embodiment

Figure 5:
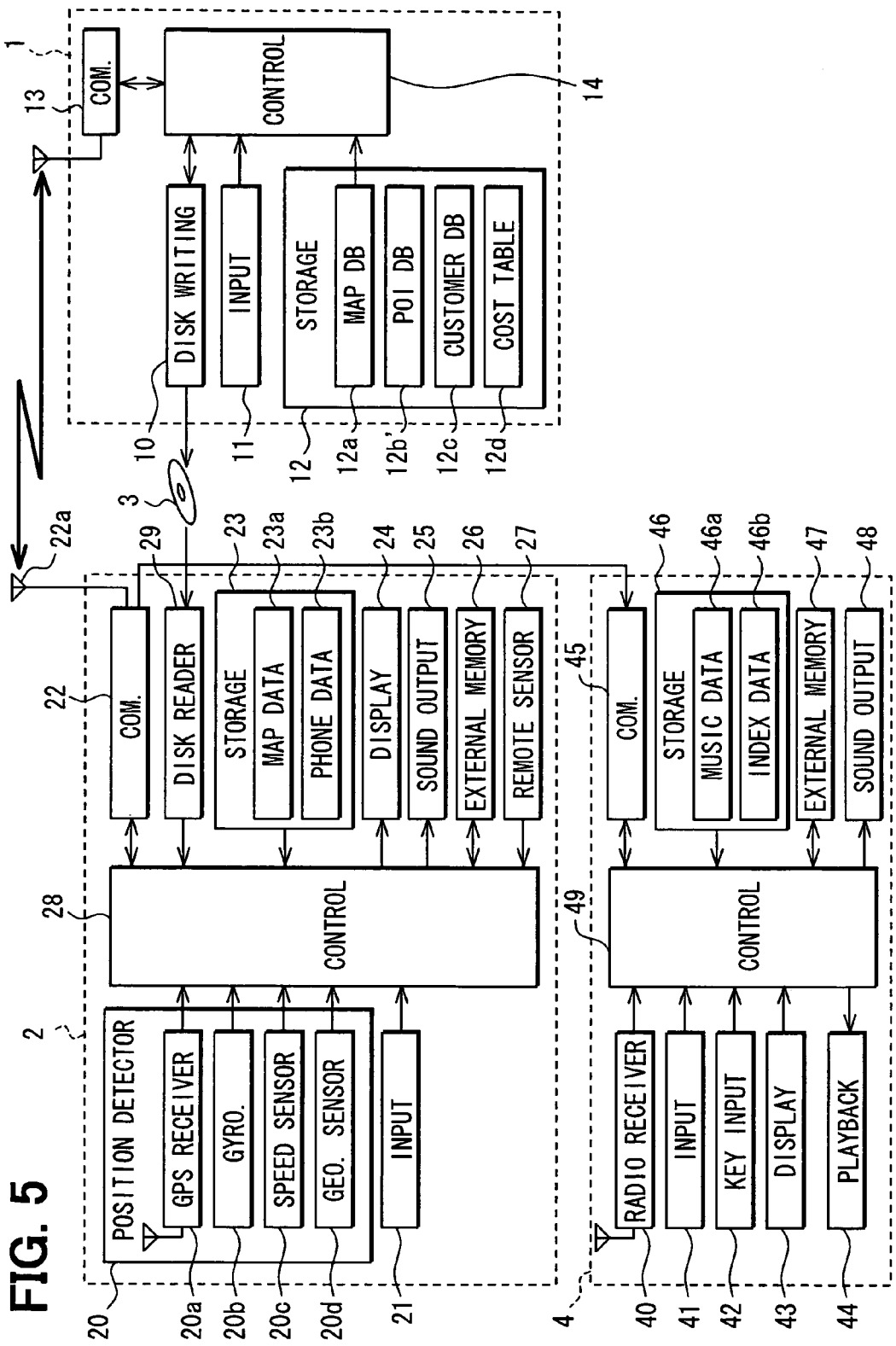
FIG. 5 is a diagram illustrating a configuration of a system in a specified map supply center, a navigation apparatus, and an audio system according to a second embodiment of the present invention.

FIG. 5 illustrates a configuration of a system 1 in a specified map supply center, a navigation apparatus 2, and an audio apparatus 4 according to a second embodiment of the invention. As is apparent from comparison with the configuration illustrated in FIG. 1, the navigation apparatus 2 in this embodiment has a function of communicating with the audio apparatus 4 cable-connected through a communication device 22, in addition to a function of communicating with the system 1 in a specified map supply center by radio through the communication device 22. The audio apparatus 4 is so constructed that it can perform such operations as playback of music according to an instruction from the navigation apparatus 2.

The audio apparatus 4 includes: a radio receiver 40 that receives broadcast waves transmitted from radio broadcasting stations; an external input device 41 for inputting audio data from such external equipment as portable audio terminals; a key input unit 42 that outputs signals corresponding to a customer's operation of such operation keys as push-button switches; a display unit 43 that displays an image corresponding to inputted image signals on the display screen of liquid crystal or the like; an audio playback unit 44 that reads and reproduces music data stored on such media as CD, DVD, and MD; a communication device 45 for communicating with the navigation apparatus 2; a storage device 46 for storing varied data; an external memory 47 for storing varied data; a sound output unit 48 that outputs sound corresponding to a sound signal; and a control circuit 49.

In the storage device 46, there are stored music data 46a, music tune index data 46b, programs executed by the control circuit 49, and the like. The music tune index data 46b is data indicating song titles, artist names, and the like in the music data 46a.

The control circuit 49 is constructed of a computer having CPU, memory, and the like, and this CPU executes varied process according to programs stored in the storage device 12.

With the above-mentioned configuration, the control circuit 49 performs the following process: the process to cause the sound output unit 48 to produce audio output of radio broadcasting, received by the radio receiver 40, in response to the customer's operation of the key input unit 42; the process to cause the sound output unit 48 to output sound played back by the audio playback unit 44; the process to cause the sound output unit 48 to output specific music from the music data 46a stored in the storage device 12; and the like.

The control circuit 49 is provided with a function of performing the following operation: when it receives a command to play back a specific music tune from the control circuit 28 of the navigation apparatus 2, it searches the music tune index data 46b for that music tune; when the music tune is found, it reads the found music tune from the music data 46a and causes it to be played back.

Figure 6:
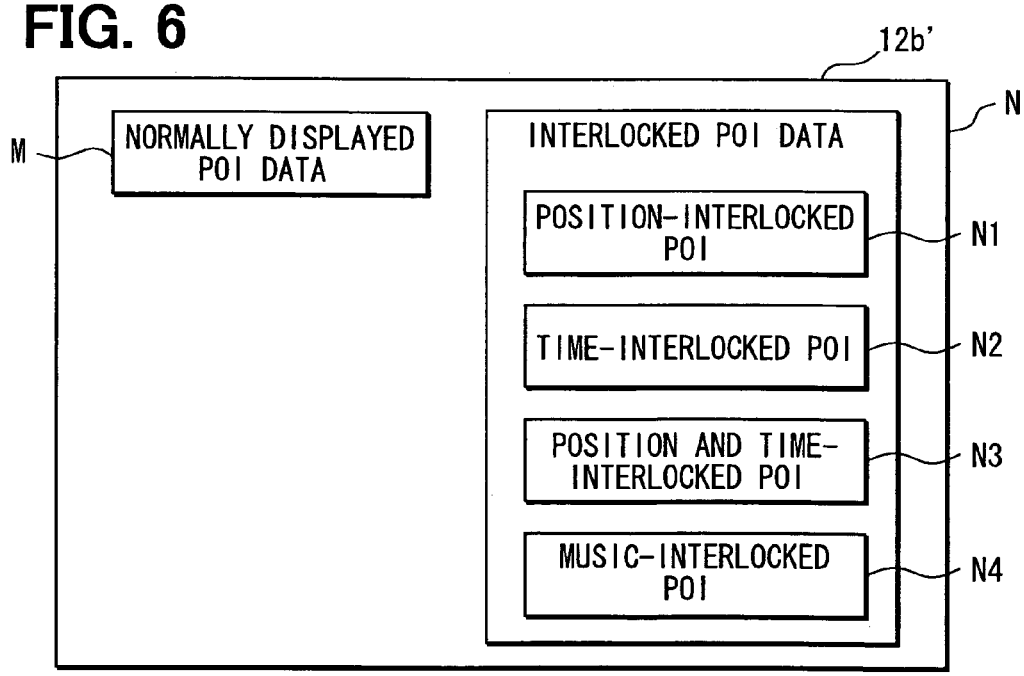
FIG. 6 is a diagram illustrating a data structure implemented in a POI database according to the second embodiment.

The system 1 in the specified map supply center in this embodiment is different from that in the first embodiment in the data structure of the POI database 12b'. FIG. 6 illustrates the data structure of the POI database 12b' in this embodiment. The data stored in the POI database 12b' is classified into normally displayed POI data M that is constantly displayed and interlocked POI data N that is displayed in interlock with position or time. The interlocked POI data N is classified into position-interlocked POI data N1, time-interlocked POI data N2, position and time-interlocked POI data N3, and music-interlocked POI data N4.

The normally displayed POI data M is what is obtained by compiling, as a database, POI information (symbolized information) for displaying various facilities, such as lodging hotels, restaurants, shopping centers, and the like, over a map. As POI information, there are stored, for example, symbols indicating hotels, symbols indicating restaurants, symbols indicating shopping centers, and the like in connection with position information that indicates positions on a map. The symbols included in the POI information in the normally displayed POI data M are constantly displayed over a map regardless of the relevant vehicle position or time.

The position-interlocked POI data N1 is what is obtained by compiling, as a database, POI information in interlock with positions. The position-interlocked POI data N1 includes POI information indicating places of historic interest, scenic spots for a drive, and various facilities including emergency medical facilities. As this POI information, there are stored symbols indicating various facilities and information for producing audio output of episodes associated with various facilities in connection with position parameters that indicate positions on a map.

The time-interlocked POI data N2 is what is obtained by compiling, as a database, POI information provided in interlock with time. The POI information contained in the time-interlocked POI data N2 includes POI information indicating, for example, night view spots and the like. As this POI information, there are stored symbols indicating various facilities and information for producing audio output of episodes associated with them in connection with position parameters that indicate positions on a map, time parameters that indicate display time, and the like.

The position and time-interlocked POI data N3 is what is obtained by compiling, as a database, POI information provided in interlock with position and time. This position and time-interlocked POI data N3 includes POI information indicating, for example, notable sites for cherry blossoms, notable sites for beautiful colored leaves, and the like. As this POI information, there are stored symbols indicating notable sites for cherry blossoms, notable sites for beautiful colored leaves, and the like and information for producing audio output of episodes associated with them in connection with position parameters that indicate positions on a map and position-time parameters that indicate positions and time, and the like.

The music-interlocked POI data N4 is what is obtained by compiling, as database, POI information for providing information associated with music according to the situation (position, time) in which map data is used.

This music-interlocked POI data N4 includes the following POI information: POI information provided in interlock with position (for example, POI information including symbols and information for producing audio output of episodes with respect to music tunes, composers, and artists related to notable sites or cities or local regions in which the relevant vehicle is located); POI information provided in interlock with time or season (for example, POI information including symbols and information for producing audio output of episodes with respect to music tunes in relation to date and hour of use or season or composers or artists who were born on the date of use); and POI information provided in interlock with the customer's or a fellow passenger's favorite genre (for example, POI information containing an index to suit the customer's or a fellow passenger's favorite genre and including symbols and information for producing audio output of episodes with respect to music tunes or artists that suit the customer's or a fellow passenger's favorite genre).

The navigation apparatus 2 in this embodiment is so constructed that the following can be implemented: a command to play back a music tune that suits the user's purpose of use of map data or the user's taste is transmitted to the audio playback unit 44 in response to the user's operation with respect to POI information; and the audio playback unit 44 plays back the music tune related to the displayed POI information.

The POI information contained in the above-mentioned music-interlocked POI data N4 includes those to which a command to play back a music tune is correlated.

Figure 7A:
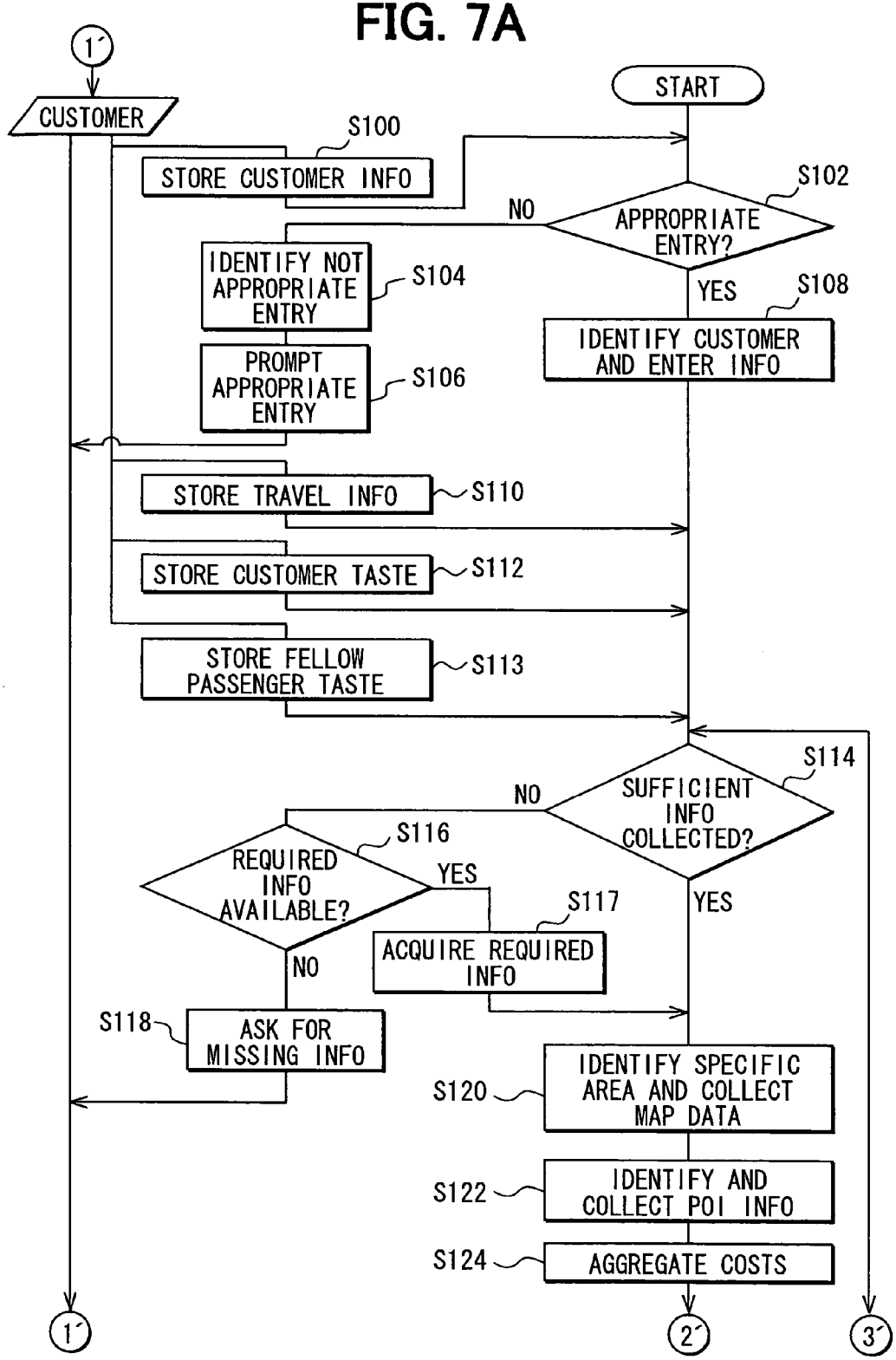
FIG. 7A is a diagram illustrating a process in which map data is generated by a control device of the system according to the second embodiment.
Figure 7B:
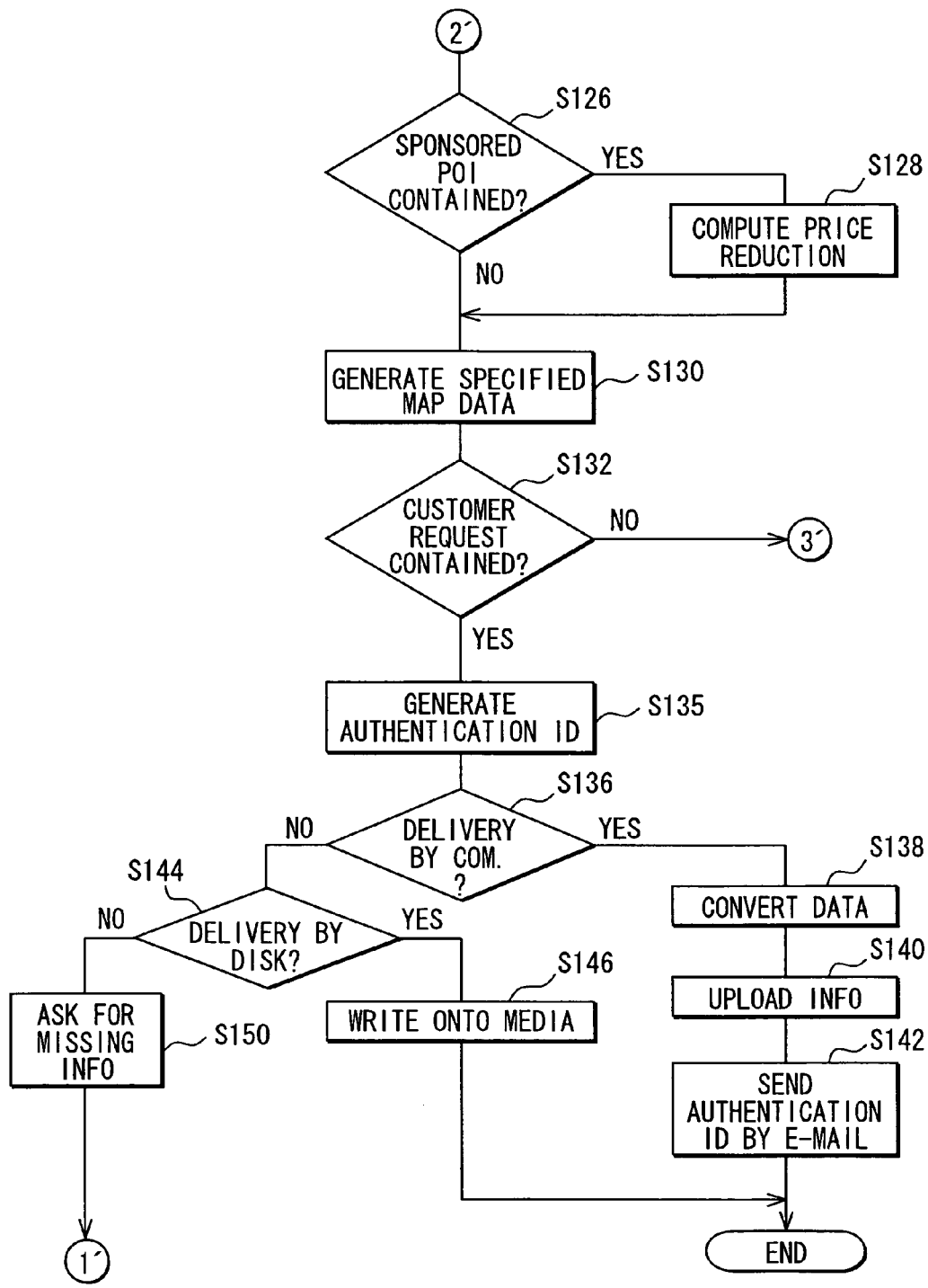
FIG. 7B is a diagram illustrating a process in which map data is generated by the control device of the system according to the second embodiment.

Description will be given to the process to generate specified map data performed by the control device 14 in this embodiment with reference to FIGS. 7A and 7B. The same portions as of the process to generate specified map data in the first embodiment, illustrated in FIGS. 3A and 3B, will be marked with the same numbers and the description of them will be omitted, and description will be given with a focus on differences.

In the example described in relation to the first embodiment, customer's travel information, including departure place, destination, transit place, circular drive route, and travel schedule, is stored in the customer database 12c at S110. In this embodiment, customer's travel information with the attributes of a fellow passenger (unique identification information, age, and the like) and the type of travel (the purpose of use of map data) added to it is stored in the customer database 12c. The fellow passenger included in customer's travel information is stored in the customer database 12c as family member, friend, or business-related person, for example. The type of travel contained in customer's travel information is stored in the customer database 12c as business, private, or business and private.

In the example described in relation to the first embodiment, information on customer's taste including information on such facilities as lodging hotels, restaurants, and shopping centers is stored in the customer database 12c at S112. In this embodiment, information on customer's taste in which a favorite music genre is added to the above-mentioned facilities, such as lodging hotels, restaurants, and shopping center, is stored in the customer database 12c.

In the example described in relation to the first embodiment, a customer's travel information is stored in the customer database 12c at S110 and information on customer's taste is stored in the customer database 12c at S112. In this embodiment, information on fellow passenger's taste is additionally stored in the customer database 12c (S113). Information on fellow passenger's taste is stored as information on favorite lodging hotels, favorite restaurants, favorite shopping centers, favorite music genres, and the like with respect to each fellow passenger.

At S122, POI information to be added to specified map data is identified from customer's travel information, information on customer's taste, and information on fellow passenger's taste, and the identified POI information is acquired from the POI database 12b'. More specific description will be given. POI information to suit a customer's purpose or taste is identified from the information on customer's taste inputted by the customer. Further, a fellow passenger is identified from the travel information inputted by the customer, and POI information to suit the fellow passenger's taste is acquired from the customer database 12c. POI information to be added to specified map data is identified, and the identified POI information is acquired from the POI database 12b' illustrated in FIG. 6.

At S130, the POI information acquired at S122 is added to the map containing routes from the departure place to the destination acquired at S120 to generate specified map data. In cases where private and business is set as the type of travel, for example, POI information suitable for private purpose and POI information suitable for business purpose are added to the map as are categorized.

Thus, specified map data in which POI information to suit the customer's purpose of use of map data or the customer's taste and POI information to suit the fellow passenger's taste are added to the map containing routes from the departure place to the destination specified by the customer is generated.

When the customer loads a disk medium with the thus generated specified map data written on it into the disk reader 29 of the navigation apparatus 2, he/she can implement traveling guidance by the navigation apparatus 2.

Figure 4:
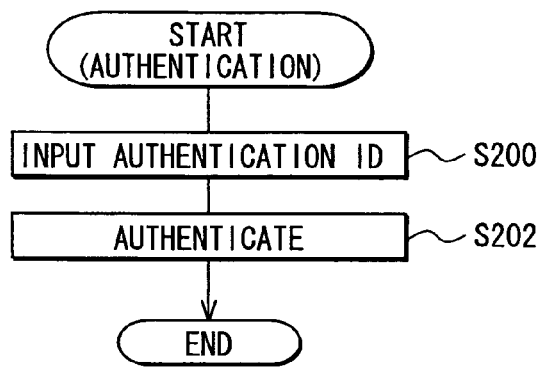
FIG. 4 is a diagram illustrating an authentication process for a navigation apparatus according to the first embodiment.
Figure 8:
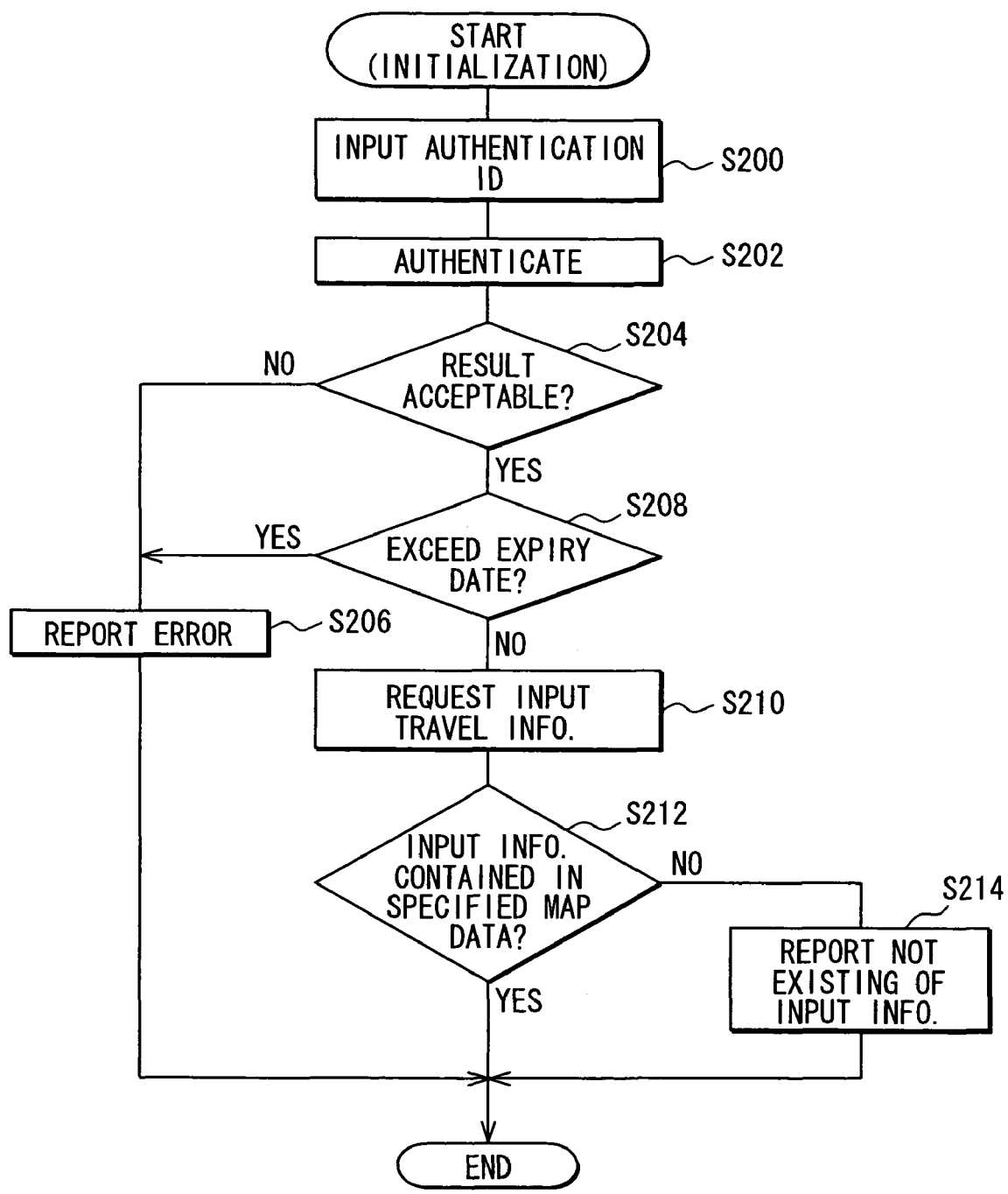
FIG. 8 is a flowchart illustrating an initialization process in a navigation apparatus according to the second embodiment.

In the example described in relation to the first embodiment, the navigation apparatus 2 performs the authentication process illustrated in FIG. 4 before providing traveling guidance. The navigation apparatus 2 in this embodiment performs the initialization process illustrated in FIG. 8, in place of the authentication process illustrated in FIG. 4, before providing traveling guidance.

Description will be given to this initialization process. When a disk medium with specified map data written on it is loaded into the disk reader 29, the control circuit 28 of the navigation apparatus 2 causes the display unit 24 to display a prompt to input an authentication ID. When the authentication ID is inputted from the input operation unit 21 in response to the customer's operation, the control circuit stores this authentication ID in the external memory 26 (S200).

Then, computation is carried out according to a predetermined algorithm using the authentication ID stored in the external memory 26, and the result of authentication computation is thereby generated. Authentication is carried out by checking this result of authentication computation with the result of authentication computation contained in the disk medium (S202).

It is determined whether or not the result of authentication computation is acceptable (S204). Specifically, it is determined whether or not the user is an authorized user, based on whether or not the result of authentication computation carried out using the authentication ID stored in the external memory 26 at S202 and the result of authentication computation contained in the disk medium agree with each other.

In cases where the results of authentication computation agree with each other, affirmative determination is made at S204, and then it is determined whether or not its expiry date has been exceeded (S208). In this embodiment, the ending time of the travel schedule in the travel information contained in specified map data is set as expiry date. It is determined whether or not the expiry date has been exceeded, based on whether or not the current date and hour has been past the ending time of the travel schedule. The current date and hour may be managed by the control circuit 28 using time information contained in a signal transmitted from GPS satellites and received by the GPS receiver 20a or using time information acquired from the specified map supply center 1.

In cases where the current date and hour has not been past the ending time of the travel schedule, affirmative determination is made at S208, and the customer is requested to input travel information (S210). Specifically, the display unit 24 of the navigation apparatus 2 is caused to display a prompt to input travel information (destination, transit place, type of travel, fellow passenger).

It is determined whether or not information corresponding to the input conditions for travel information exists in the specified map data (S212). Specifically, it is determined whether information corresponding to the travel information inputted by the customer exists in the specified map data.

In cases where information corresponding to the travel information inputted by the customer does not exist in the specified map data, for example, in cases where the destination inputted by the customer exists out of the area covered by the specified map data, negative determination is made at S212. Then, it is reported that the input conditions do not partly or wholly exist in the specified map data (S214). Specifically, the display unit 24 is caused to display a message indicating that the input conditions do not partly or wholly exist in the specified map data, and further the sound output unit 25 is caused to produce the audio output of the report.

In cases where information corresponding to the travel information inputted by the customer exists in the specified map data, affirmative determination is made at S212, and this process is terminated.

In cases where the results of authentication computation do not agree with each other at S204 or in cases where it is determined at S208 that the expiry date has been exceeded, it is notified that an authentication error or an expiry date error has occurred (S206). At the same time, information indicating that an authentication error or an expiry date error has occurred is stored in memory, and use of specified map data is prohibited. The process is prevented from proceeding to the provision of POI information in traveling guidance to be described later and this process is terminated.

Figure 9:
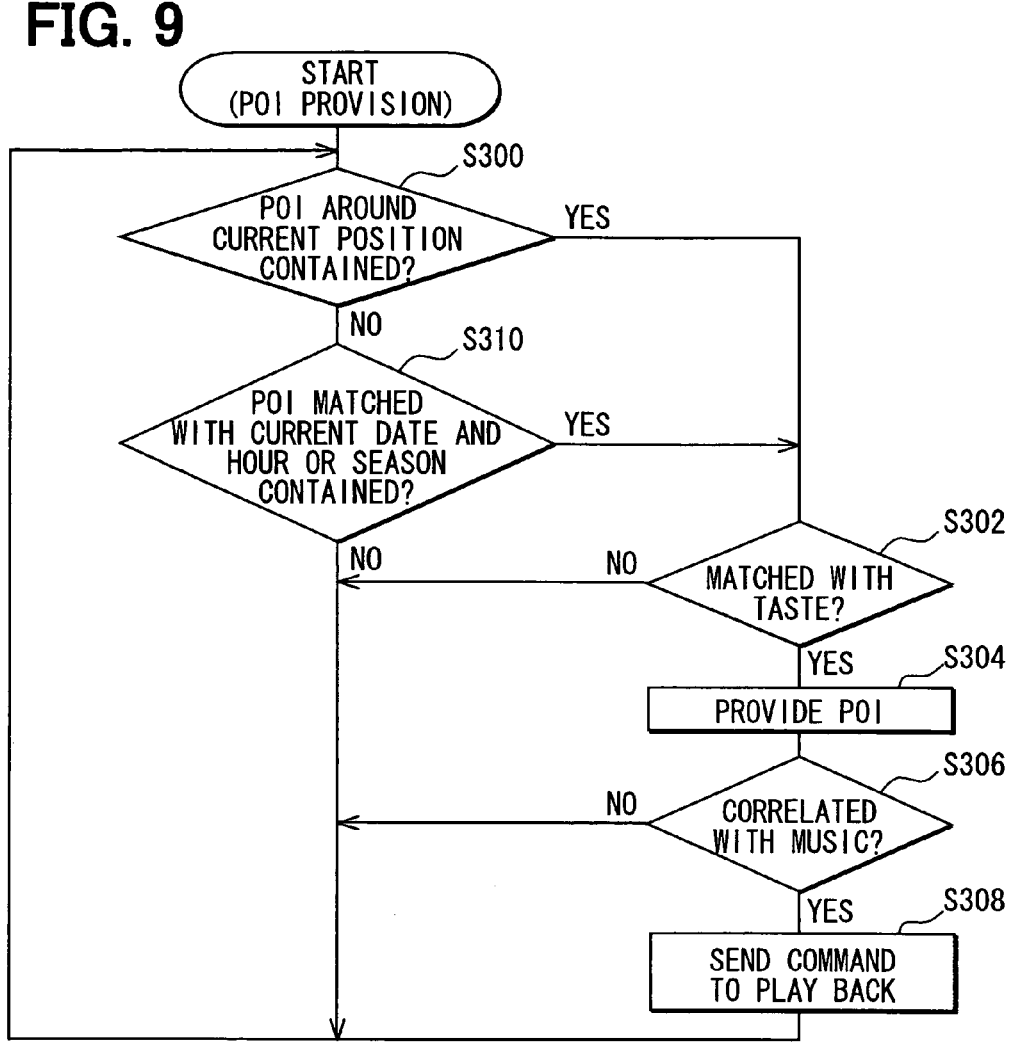
FIG. 9 is a flowchart illustrating a process in which a navigation apparatus provides POI information during traveling guidance according to the second embodiment.

The navigation apparatus 2 in this embodiment performs the process to provide POI information in traveling guidance illustrated in FIG. 9 in cases where it is determined by the above-mentioned initialization process that the result of authentication computation is acceptable and, at the same time, it is determined that the current date and hour has not been past the expiry date. This process to providing POI information in traveling guidance is performed regardless of whether or not a guided route to a destination has been set by route search process.

At S300, it is determined whether or not POI information added to the specified map data exists with respect to the vicinity of the current position. Specifically, it is determined whether or not POI information added to the specified map data exists with respect to the area within a predetermined range (for example, within a 2-kilometer radius) relative to the current position.

At S310, it is determined whether or not POI information having a time parameter matched with the current date and hour or season is added to the specified map data. Specifically, it is determined whether or not POI information having a time parameter matched with the current date and hour or season is added to the specified map data by comparing the current date and hour and season with the time parameter correlated to POI information.

At S302, it is determined whether or not POI information is matched with information on customer's or fellow passenger's taste. Specifically, it is determined whether or not POI information, determined to exist with respect to the area within a predetermined range relative to the current position at S300, is POI information matched with information on customer's or fellow passenger's taste.

Therefore, the following determination is made in cases described next, for example: cases where POI information acquired from the position-interlocked POI data N1 is added to specified map data as POI information matched with information on customer's or fellow passenger's taste; at the same time, the relevant vehicle position is located in the position indicated by the position parameter of POI information acquired from the position-interlocked POI data N1. In these cases, affirmative determination is made at S300, and affirmative determination is made at S302. Then, the POI information is provided (S304).

Specifically, the display unit 24 is caused to display symbols contained in the POI information over a map by pop-up, and the sound output unit 25 is caused to produce the audio output of information for the audio output of episodes contained in the POI information.

Figure 10:
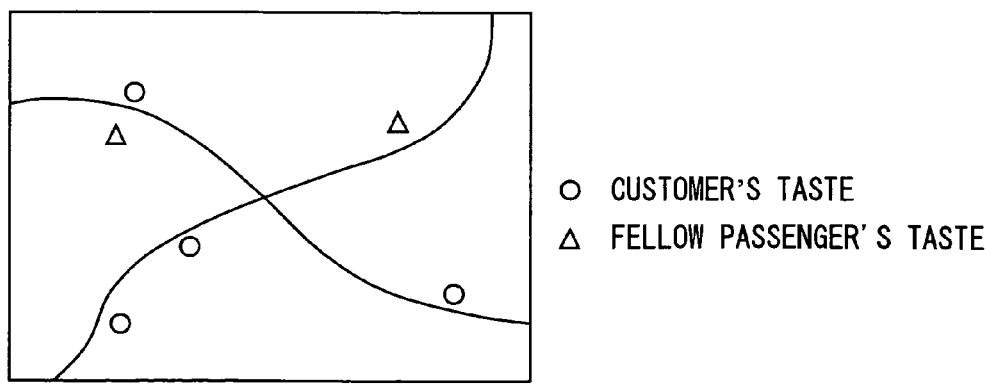
FIG. 10 is a diagram illustrating an example of a display of POI information by a navigation apparatus according to the second embodiment.

Thus, for example, when the current position of the relevant vehicle comes in the vicinity of a place of historic interest, a scenic spot for a drive, or the like matched with information on customer's or fellow passenger's taste, what illustrated in FIG. 10 takes place. That is, symbols for a place of historic interest, a scenic spot for a drive, or the like matched with information on customer's or fellow passenger's taste are displayed over a map on the display unit 24 by pop-up. Episodes associated with these places of historic interest, scenic spots for a drive, and the like are notified from the sound output unit 25 by voice. When the current position of the relevant vehicle moves away from the vicinity of a place of historic interest, a scenic spot for a drive, or the like matched with information on customer's or fellow passenger's taste, the symbol for the facility, displayed up to now, becomes invisible.

The following determination is made in cases described next, for example: cases where POI information acquired from the time-interlocked POI data N2 is added to specified map data as POI information matched with information on customer's or fellow passenger's taste; at the same time, the current date and hour is matched with the date and hour or season indicated by the time parameter of the POI information acquired from the time-interlocked POI data N2. In these cases, negative determination is made at S300, affirmative determination is made at S310, and affirmative determination is made at S302. Then, the POI information is provided (S304).

Specifically, the display unit 24 is caused to display symbols contained in the POI information over a map by pop-up, and the sound output unit 25 is caused to produce the audio output of information for the audio output of episodes contained in the POI information.

Thus, for example, as darkness sets in, symbols for night view spots and the like are displayed over a map on the display unit 24 by pop-up, and episodes associated with these night view spots and the like are outputted from the sound output unit 25 by voice. When the current date and hour or season comes to disagree with the time parameter of the POI information, the symbols for the facilities, displayed up to now, become invisible.

At the next step, or S306, it is determined whether or not POI information that exists with respect to the area within a predetermined range including the current position is POI information with which information indicating a music tune to be played back on the audio playback unit 44 is correlated.

In cases where information indicating a music tune to be played back on the audio playback unit 44 is not correlated with the POI information, negative determination is made at S306, and the process is returned to S300.

In cases where information indicating a music tune to be played back on the audio playback unit 44 is correlated with the POI information, affirmative determination is made at S306. Then, a command to play back the music tune in correlation with the POI information is transmitted to the audio playback unit 44 (S308). Specifically, a command to play back the music tune correlated with the POI information in response to the user's operation with respect to the POI information is transmitted to the audio playback unit 44, and the process is returned to S300.

When the control circuit 49 of the audio playback unit 44 receives this command, it searches the music tune index data 46b for that music tune. When the relevant music tune is found, the found music tune is read from the music data 46a and played back.

In cases where it is determined at S302 that the POI information is not that matched with information on customer's or fellow passenger's taste, the process is returned to S300 without providing POI information.

POI information acquired from the normally displayed POI data M and added to specified map data is constantly displayed regardless of the current position of the relevant vehicle or the current date and hour or season.

According to the above-mentioned construction, information to suit a user's purpose of use of map data or a user's taste is provided at a time indicated by a time parameter added to POI information to suit the user's purpose of use of map data or the user's taste. Therefore, information to suit the user's purpose of use of map data or the user's taste can be provided in a timely manner.

As mentioned above, when the relevant vehicle is positioned in a place indicated by a position parameter added to POI information to suit a user's purpose of use of map data or a user's taste, information to suit the user's purpose of use of map data or the user's taste is provided. Therefore, POI information can be provided in a timely manner.

As mentioned above, when the current position of the relevant vehicle is located in a position indicated by a position-time parameter and a time indicated by the position-time parameter has come, information to suit the user's purpose of use of map data or the user's taste is provided. Therefore, POI information can be provided in a timely manner.

Since expiry date information for limiting the use of specified map data is added to the specified map data, the period for which the specified map data can be used can be limited. Further, the user's burden can be reduced by limiting the period for which he/she can use specified map data and accordingly cutting the price of the specified map data.

Since information indicating medical institutions contained in specified map data is provided, a user can easily gain information on the medical institutions when he/she becomes ill or gets injured.

As mentioned above, a command to play back a music tune matched with a user's purpose of use of map data or a user's taste is transmitted to the audio apparatus 4 in response to the user's operation with respect to information to suit the user's purpose of use of map data or the user's taste. Therefore, a music tune matched with the user's purpose of use of map data or the user's taste can be automatically played back.

Other Embodiments

In the examples described in relation to the above embodiments, a navigation apparatus is used as an information delivery apparatus. However, the invention is not limited to the navigation apparatus, and it may be applied to cases where a personal digital assistant (PDA) is used as an information delivery apparatus, for example.

In the examples described in relation to the above embodiments, a customer operates the navigation apparatus 2 to log onto the Internet and inputs customer information, travel information, and information on customer's taste on a website on the Internet. Instead, the invention may be so constructed that a user logs onto the Internet from a personal computer at his/her home, for example, and inputs customer information, travel information, information on customer's taste on a website on the Internet.

In the examples described in relation to the above embodiments, POI information to suit a user's purpose of use of map data or a user's taste is added to map data covering areas containing routes from a departure place to a destination specified by the user to generate specified map data. However, the invention is not limited to map data covering areas containing routes from a departure place to a destination specified by a user, and it may be so constructed that, for example, map data covering a predetermined specific area is generated.

In the examples described in relation to the above embodiments, POI information to suit a customer's purpose or taste is acquired from a symbol database, and the POI information to suit the customer's purpose or taste is added to a map containing routes from a departure place to a destination specified by a customer to generate specified map data. However, the invention is not limited to such POI information, and, for example, tourist information or the like may be added as textual information. In this case, tourist information or the like can be stored in the POI database 12b.

In the examples described in relation to the above embodiments, a request to generate specified map data, from the customer at a navigation apparatus 2, is accepted on a website on the Internet. Instead, a request to generate specified map data may be accepted by e-mail or mail, for example.

In the examples described in relation to the above-embodiments, specified map data is provided either by downloading from a specific website or by mailing such disk media 3 as CD or DVD. Instead, it may be transmitted as attachment file to e-mail or specified map data may be written into ROM and this ROM may be sent by mail.

In the examples described in relation to the above embodiments, the following process is performed: it is determined at S114 whether or not sufficient information to generate specified map data has been collected; in cases where it is determined that sufficient information to generate specified map data has not been collected, the customer database 12c is searched for information on customer's taste and the information is acquired at S117. Instead, information on customer's taste may be acquired from the customer database 12c to generate specified map data without making the determination of S114.

In the examples described in relation to the above embodiments, specified map data is generated and provided with the view of a customer's private travel. Instead, specified map data specialized for business purposes, for example, for commercial vehicle operation management, may be generated and provided. A home-delivery service provider that provides truck delivery service across the country will be taken as an example. The invention makes it possible to generate and provide specified map data to which information on the individual service locations and information required for the operation of trucks, tailored to suit this home-delivery service provider's purpose or request, are added.

In the examples described in relation to the above embodiments, an authentication ID is generated from customer's membership information, vehicle ID, and information on the model of car navigation apparatus used contained in customer information at S134. Instead, an authentication ID may be generated, for example, in the control device 14 of the system 1 in a specified map supply center.

In the examples described in relation to the above embodiments, a user is prompted to input the composition of occupants to identify a fellow passenger. Instead, data may be acquired, for example, by short-range radio communication with the portable device (for example, cellular phone) possessed by a fellow passenger to identify the fellow passenger.

The description of the above embodiments has been given to cases where POI information acquired from the position-interlocked POI data N1 is provided in the process illustrated in FIG. 9, cases where POI information acquired from the time-interlocked POI data N2 is provided in the same process, and cases where POI information acquired from the music-interlocked POI data N4 is provided in the same process. Instead, POI information acquired from the position and time-interlocked POI data N3 may be provided. That is, POI information to suit a user's purpose of use of map data or a user's taste may be provided when the following conditions are met: POI information acquired from the position and time-interlocked POI data N3 is added as information to suit the user's purpose of use of map data or the user's taste is added to specified map data; the current position of the relevant vehicle is located in a position indicated by the position-time parameter of POI information acquired from the position and time-interlocked POI data N3; and a time indicated by the position-time parameter has just come. For example, the following operation can be performed: "spring" is set beforehand in specified map data as the position-time parameter of POI information indicating notable sites for cherry blossom, acquired from the position and time-interlocked POI data N3; POI information indicating notable sites for cherry blossom is provided only when the season in which map data is used is spring and the relevant vehicle is positioned in proximity to a notable site for cherry blossom.

In the examples described in relation to the above embodiments, POI information is provided when it is determined at S302 that POI information is matched with information on customer's or fellow passenger's taste. Even when it is determined that POI information is not matched with information on customer's or fellow passenger's taste, the POI information may be provided. For example, POI information on such medical institutions as emergency medical institutions, pediatric clinics, major hospitals, or the like suitable for an attribute (age) of a customer or a fellow passenger may be provided. Or, POI information on medical institutions may be provided regardless of an attribute (age) of a customer or a fellow passenger. In this case, symbols for medical institutions may be constantly displayed, or they may be displayed by pop-up when the current position of the relevant vehicle comes close to an emergency medical institution.

In the examples described in relation to the above embodiments, POI information to suit occupants (user and fellow passengers) is provided at S304. Provided POI information may be varied according to the user's purpose of use of map data. For example, the following operation may be performed: when the purpose of use of map data is private, POI information to suit private travel, such as information on theme parks, is provided; when the purpose of use of map data is business, POI information related to business, for example, information on local famous companies and the like, is provided.

In the examples described in relation to the above embodiments, the ending time of the travel schedule in travel information contained in specified map data is set as expiry date. In this invention, however, the expiry date is not limited to the ending time of the travel schedule in travel information, and the expiry date may be set as a certain period, for example.

In the examples described in relation to the above embodiments, a command to play back a music tune correlated with POI information in response to a user's operation with respect to the POI information is transmitted to the audio playback unit 44 at S308. Instead, a command to play back a music tune correlated with POI information in time with provision of the POI information may be transmitted.

Each or any combination of processes, steps, or means explained in the above can be achieved as a software unit (e.g., subroutine) and/or a hardware unit (e.g., circuit or integrated circuit), including or not including a function of a related device; furthermore, the hardware unit can be constructed inside of a microcomputer.

Furthermore, the software unit or any combinations of multiple software units can be included in a software program, which can be contained in a computer-readable storage media or can be downloaded and installed in a computer via a communications network.

It will be obvious to those skilled in the art that various changes may be made in the above-described embodiments of the present invention. However, the scope of the present invention should be determined by the following claims.

What is claimed is:

1. A method for generating map data, the method comprising:

acquiring certain map data, which is relating to a specified area, from a map database;

acquiring certain information, which suits a user's intention relating to generating map data, from an additional information database;

generating specified map data by adding addition information, which is included in the certain information and related to the certain map data, to the certain map data;

computing a price of the specified map data using a cost table;

adding the computed price to the specified map data;

computing the price reduction based on the discounting advertisement cost corresponding to sponsored symbolized information added to the specified map data; and discounting the computed price reduction from the computed price of the specified map data, wherein the additional information database contains sponsored symbolized information, addition of which allows map data to receive a price reduction provided by a corresponding sponsor, and wherein the cost table includes a discounting advertisement cost for providing the price reduction with respect to the sponsored symbolized information.

2. The method for generating map data according to claim 1,
wherein the user's intention relating to generating map data includes at least one of (i) a user's purpose of use of map data and (ii) a user's taste.

3. The method for generating map data according to claim 1,
wherein the specified area includes a route from a departure place to a destination, both of which are specified by the user.

4. The method for generating map data according to claim 1,
wherein the user's intention is specified by the user, and
wherein the certain information, which suits the user's intention specified by the user, is acquired from the additional information database.

5. The method for generating map data according to claim 1, further comprising:
acquiring information to suit the user's intention from a customer database in which a use history of the user is stored,
wherein, based on the information acquired from the customer database, the certain information, which suits the user's intention relating to generating map data, is acquired from the additional information database.

6. The method for generating map data according to claim 1, further comprising:
adding authentication information for authenticating the user to the specified map data.

7. The method for generating map data according to claim 1, further comprising:
adding expiry date information for limiting use of the specified map data to the specified map data.

8. An information delivery apparatus for providing a specified map data provided by an outside,
the specified map data being generated by the method according to claim 1,
the information delivery apparatus comprising:
a map data obtaining unit that obtains from the outside the specified map data, which the addition information is added to;
a user information specifying unit that specifies the user's intention; and
an information providing unit that provides the obtained specified map data and the obtained addition information.

9. The information delivery apparatus according to claim 8,
wherein the user's intention relating to generating map data includes at least one of (i) a user's purpose of use of map data and (ii) a user's taste.

10. The information delivery apparatus according to claim 8, further comprising:
a time managing unit that detects a date and an hour,
wherein the addition information includes a time parameter indicating a time including a date and an hour, and
wherein the information providing unit provides the obtained addition information at the time indicated by the time parameter.

11. The information delivery apparatus according to claim 8, further comprising:
a position detector that detects a position of the apparatus,
wherein the addition information includes a position parameter indicating a position, and
wherein the information providing unit provides the obtained addition information when the apparatus exits at the position indicated by the position parameter.

12. The information delivery apparatus according to claim 8, further comprising:
a time managing unit that detects a date and an hour; and
a position detector that detects a position of the apparatus,
wherein the addition information includes a position-time parameter indicating a position and a time including a date and an hour, and
wherein the information providing unit provides the obtained addition information in a case where the apparatus exists at the position indicated by the position-time parameter at the time indicated by the position-time parameter.

13. The information delivery apparatus according to claim 8, further comprising:
a time managing unit that detects a date;
an expiry date determining unit that determines whether a current date exceeds an expiry date, wherein the expiry date is included in the specified map data; and
a use prohibiting unit that prohibits use of the specified map data when the current date is determined to exceed the expiry date.

14. The information delivery apparatus according to claim 8, further comprising:
an authentication unit that authenticates the user by checking authentication information included in the specified map data against authentication information, which is obtained based on information inputted by the user; and
a use prohibiting unit that prohibits use of the specified map data when the user is not authenticated by the authentication unit.

15. The information delivery apparatus according to claim 8,
wherein the specified map data includes information indicating a medical facility, and
wherein the information providing unit provides the information indicating the medical facility included in the specified map data.

16. The information delivery apparatus according to claim 8, further comprising:
a command transmitting unit that transmits a command, which is associated with the addition information and causes an audio apparatus to play a music tune that suites the user's intention.

17. The information delivery apparatus according to claim 8,
wherein the specified map data is provided from the outside via wireless communication that communicates the specified map data.

18. The information delivery apparatus according to claim 8,
wherein the specified map data is provided from the outside via a storage medium that stores the specified map data.

19. A system for generating map data, the system comprising:
a map data acquiring unit that acquires certain map data, which is relating to a specified area, from a map database;
an information acquiring unit that acquires certain information, which suits a user's intention relating to generating map data, from an additional information database; and
a generating unit that generates specified map data by adding addition information, which is included in the certain information and related to the certain map data, to the certain map data; and a computing unit that computes a price of the specified map data using a cost table, the computed price being added to the specific map data, wherein the additional information database contains sponsored symbolized information, addition of which allows map data to receive a price reduction provided by a corresponding sponsor, and wherein the cost table includes a discounting advertisement cost for providing the price reduction with respect to the sponsored symbolized information, the computed unit being further configured, when computing the price of the specified map data, to (i) compute the price reduction based on the discounting advertisement cost corresponding to sponsored symbolized information added to the specified map data; and (ii) discount the computed price reduction from the computed price of the specified map data.

20. The system for generating map data according to claim 19, wherein the user's intention relating to generating map data includes at least one of (i) a user's purpose of use of map data and (ii) a user's taste.

* * * * *